J. WILLIAMS.
Calendar Clock.

No. 13,341.

Patented July 24, 1855.

UNITED STATES PATENT OFFICE.

JOHN WILLIAMS, OF HARTFORD, CONNECTICUT.

CALENDAR-CLOCK.

Specification of Letters Patent No. 13,341, dated July 24, 1855.

*To all whom it may concern:*

Be it known that I, JOHN WILLIAMS, of the city and county of Hartford and State of Connecticut, have invented a new and useful Improvement in Calendar-Clocks; and I do hereby declare that the following is a full, clear, and exact description of the same, reference being had to the accompanying drawings, forming part of this specification, in which—

Figure 1:
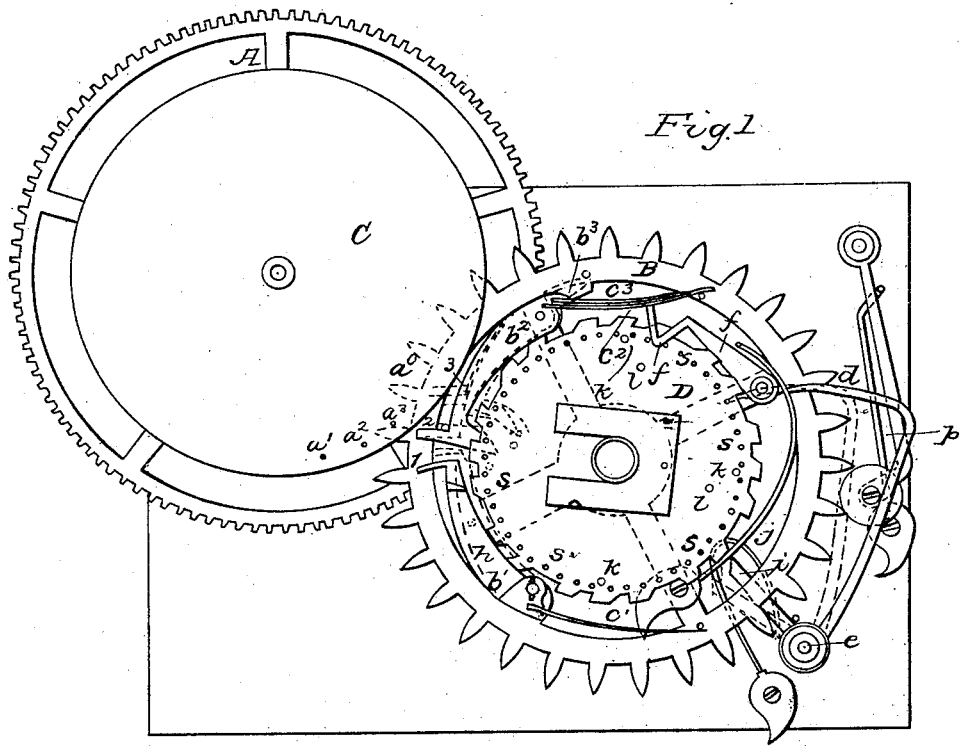
Figure 2:
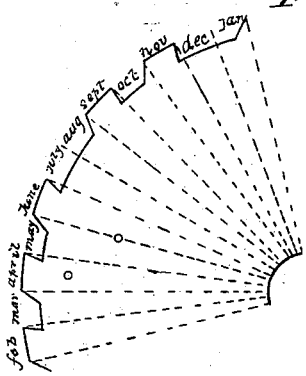

Figure 1, is a face view of that part of the calendar clock to which my invention relates. Fig. 2, is a diagram illustrative of the construction of what is hereinafter termed the "four year wheel."

Similar letters of reference indicate corresponding parts in both figures.

My invention consists in certain novel means of causing a calendar clock to effect the necessary changes in its movement for the irregularity in the length of the months.

To enable those skilled in the art to make and use my invention I will proceed to describe its construction and operation.

A, is a wheel which receives a continuous rotary motion, completing its revolution once in a day.

B, is the wheel which carries the hand to indicate the day of the month on the dial. This wheel has thirty one divisions or teeth on its periphery and is moved the distance of one tooth every day by a pin or tooth $a$, on the back of a disk C, secured to the wheel A, coming in contact with and passing one of its teeth, it is prevented moving more than one tooth at a time by means of a spring roller pawl $p$, which engages with its teeth. The above movement exactly completes the revolution of the wheel B, in each month of thirty one days, but at the termination of the shorter months, the said wheel has not completed its revolution by so many teeth as the number of days of the month is less than thirty-one, and therefore in order to bring the hand to the first day of the month on the dial at the commencement of the succeeding months I complete the movement by other means. The means which I employ for this purpose consist of three sliding teeth 1, 2, and 3 attached to the front face of the wheel B, and three pins or teeth $a^1$, $a^2$, $a^3$, secured in fixed positions on the back of the disk C. The three sliding teeth 1, 2, 3, are attached to three arms $b^1$, $b^2$, $b^3$, which are pivoted to the wheel B, in such a manner that the teeth can severally be thrown outward by the means hereinafter described to such positions as to gear with the pins or teeth $a^1$, $a^2$, $a^3$, on the disk C, in which positions they are shown in black in Fig. 1, or be drawn inward by springs $c^1$, $c^2$, $c^3$, to such positions as to pass the said teeth $a^1$, $a^2$, $a^3$, in their revolution without touching the latter teeth, in which positions they are all shown in red outline in Fig. 1.

During every long month of thirty one days the sliding teeth all remain in the latter condition but during the months of thirty days the sliding tooth 1, is moved outward to its operative position in order that it may be at the end of the month shortly after the action of the tooth $a$, on the wheel B, be acted upon by the tooth $a^3$, on the disk C, for the purpose of moving the wheel B, the required distance, equal to one tooth or division, to complete its monthly revolution. During the month of February of every year except leap year, which contains only twenty-eight days, all three of the sliding teeth require to be thrown into their operative positions, the tooth 3, to be acted upon by the tooth $a^3$, of the disk, the tooth 2, by the tooth $a^2$, and the tooth 1, by the tooth $a^1$, to move the wheel B, the distance, equal to three teeth or divisions, necessary to complete the revolution. But during the month of February in leap year which contains twenty nine days, only the two sliding teeth 1, and 2 are thrown into operative positions, the latter to be acted upon by the tooth $a^3$, and the former by the tooth $a^2$, of the disk C, to give the movement equal to two teeth or divisions, to complete the revolution of the wheel B.

The throwing of the teeth 1, 2, 3, into operative positions is effected by means of a wheel D, which may be termed the "four year wheel" and which fits loosely on the arbor of the wheel B. This wheel has on its outer surface forty eight pins or teeth $s$, $s$, arranged in a circle at equal distances apart, the number corresponding to the number of months in four years, and it is caused to rotate with the wheel B, by means of a pawl $f$, which is attached to the said wheel B, and caused to engage with the pins $s$, $s$, by means of a spring $g$, also attached to B. The form of the tooth of the pawl $f$, is such that it will slip over the pins $s$, $s$, easily to allow the wheels B, and D, to move independently of each other. In order that once in four years one wheel may complete a revolution independently of the other, the wheel D, once during every month is thrown back a forty eighth part of a revolution by means of a catch $d$, which swings on a fixed pivot $e$, and which, at any suitable point in the revolution of the wheel B, is thrown from the position shown in black outline in Fig. 1 to the position shown in red for the purpose of engaging between two of the pins or teeth $s, s$, and arresting the wheel D, until B, has moved far enough for the pawl to pass over one of the pins or teeth $s, s$, into the next space to that which it previously occupied. The movement of the catch is effected by means of a pin $h$, on the back of the wheel B, coming in contact with and moving aside an arm $i$, attached to the catch. The catch is thrown instantaneously out of operation, as it is shown in black in Fig. 1, when it has performed its duty, by means of a spring $j$, applied to act upon the arm $i$. The periphery of the wheel D, is divided into forty eight equal parts, for the forty-eight months of four years, and the long months of thirty one days are represented by projecting divisions, and all the shorter ones by receding divisions. This will be best understood by reference to Fig. 2 which represents on a larger scale than Fig. 1 a fourth part of the wheel divided by red radial lines into twelve parts, marked to correspond with the months of a year. The sliding tooth 1, rests upon the periphery of this wheel and the projections are made with their back sides inclined to enable them to lift the tooth 1, as they pass it. The movement effected by the catch $d$, during a month of thirty one days brings the wheel D, to such a position that the tooth 1, is drawn or held by its spring $c^1$, into one of the recesses in the wheel as shown in red lines in Fig. 1, where it is not operative; but the movement effected during any shorter month causes the tooth to rise or be thrown outward upon one of the projections and into an operative position to be acted upon by one of the pins or teeth $a^1, a^2, a^3$, on the disk D, as it passes the said disk at the end of the month. On the back of the wheel D, all in the same circle, at equal distances apart, and in proper positions relative to the monthly divisions on the periphery of the wheel D, there are four pins or teeth $k, k, k, k$, one of which during the month of February of every year is caused by the movement of the wheel D, on the arbor of B, to come in contact with throw out and hold the sliding tooth 2, to its operative position so that at the termination of the month when it arrives opposite the disk D, it will be acted upon by one of the pins or teeth $a^1, a^2, a^3$, of the said disk. The next backward movement of the wheel D, which takes place some time in March causes the pin or tooth $k$, to pass the sliding tooth 2, and allow it to be thrown by its spring $c^1$, $c^2$, to the position shown in red in Fig. 1, where it remains inoperative till February of the next year. Near three of these pins $k$, there are three pins $l, l, l$, but near the fourth there is no such pin. One of these pins $l$, during the February of every year except leap year comes into operation on the sliding tooth 3, simultaneously with the action of its contiguous tooth $k$, upon the sliding tooth 2, but during leap year the tooth 3, remains inoperative, owing to the absence, near that pin $k$, which acts during leap year, of a pin $l$, to throw it outward.

The mechanism is represented in the drawing in black outline, in the condition in which it would be at the termination of the month of February when that month contains only twenty-eight days. The pin $a$, on the disk, C, is just coming into operation on the twenty-eighth tooth of the wheel B. This operation will be followed first by the action of the tooth $a^3$, upon the sliding tooth 3, next by the action of the tooth $a^2$, on the sliding tooth 2, and finally by the action of the tooth $a^1$, on the sliding tooth 1, to complete the revolution of the wheel B. When the month of February contains twenty-nine days, and the tooth 3, is out of operation the action of the tooth $a$, on the twenty-ninth tooth of B, will be followed first by the action of the tooth $a^3$, upon the sliding tooth 2, and finally by the action of $a^2$ on the sliding tooth 1. At the termination of the thirty day months the action of the pin $a$, on the thirtieth tooth of B, will be followed immediately by the action of the pin $a^3$, on the sliding tooth 1.

A single sliding tooth may, if found desirable, be made to perform the duty of both the sliding teeth 2 and 3 by being thrown out so far every year except leap year, that the tooth or pin on the disk C, which acts upon it, will in passing it, move the wheel B, the distance of two teeth, but by being thrown out in leap year only so far that the tooth or pin on the disk C, will move it the distance of one tooth. In using this single tooth the wheel D, would only require four pins instead of the seven $k$ and $l$, before described, three of these pins being arranged at equal distances from its center to drive the sliding tooth out far enough for the double movement, of the wheel B, and the fourth nearer to the center to drive the sliding tooth out only far enough for the single movement of the wheel B.

What I claim as my invention and desire to secure by Letters Patent, is—

Completing the revolution of the wheel B, at the end of the shorter months by means of sliding teeth which are suitably attached to the said wheel and severally or collectively, as required, brought into such positions as to enable them to be acted upon by the teeth on the daily revolving wheel A, by means of the "four year wheel" D, which is on the same arbor as, but independent of, the wheel B, the said wheel D, acting upon the said sliding teeth by means of its forty eight projecting and receding divisions, and by pins or teeth arranged upon it as described, and being for that purpose moved one forty eighth part of a revolution independently of the wheel B, for every revolution of the said wheel B, substantially as herein set forth; but I do not claim the method of giving motion to the aforesaid wheel D, as that has been before employed for a similar purpose.

JOHN WILLIAMS.

Witnesses:
J. W. COOMBS,
J. G. MASON.